(12) United States Patent
Taniuchi (10) Patent No.: US 8,561,171 B2
(45) Date of Patent: Oct. 15, 2013

(54) INFORMATION PROCESSOR, INFORMATION PROCESSING METHOD, AND COMPUTER PROGRAM PRODUCT

(75) Inventor: Kenichi Taniuchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/440,251

(22) Filed: Apr. 5, 2012

(65) Prior Publication Data

US 2012/0324570 A1 Dec. 20, 2012

(30) Foreign Application Priority Data

Jun. 17, 2011 (JP) ................................ 2011-135066

(51) Int. Cl.
*G06F 21/00* (2013.01)

(52) U.S. Cl.
USPC .......................................................... 726/19

(58) Field of Classification Search
USPC .......................................................... 726/19
See application file for complete search history.

(56) References Cited

U.S. PATENT DOCUMENTS

| | | | | |
|---|---|---|---|---|
| 5,559,961 | A * | 9/1996 | Blonder | 726/18 |
| 6,980,081 | B2 * | 12/2005 | Anderson | 340/5.53 |
| 7,266,693 | B1 * | 9/2007 | Potter et al. | 713/169 |
| 7,574,739 | B2 * | 8/2009 | Shirakawa | 726/19 |
| 7,841,000 | B2 * | 11/2010 | Kawano et al. | 726/18 |
| 7,873,995 | B2 * | 1/2011 | Bagga et al. | 726/19 |
| 7,953,983 | B2 * | 5/2011 | Holt et al. | 713/186 |
| 7,992,202 | B2 * | 8/2011 | Won et al. | 726/19 |
| 8,117,458 | B2 * | 2/2012 | Osborn et al. | 713/183 |
| 8,145,912 | B2 * | 3/2012 | McLean | 713/182 |
| 8,214,892 | B2 * | 7/2012 | Cohen et al. | 726/19 |
| 8,281,147 | B2 * | 10/2012 | Florencio et al. | 713/184 |
| 8,336,086 | B2 * | 12/2012 | Seo | 726/5 |
| 8,387,126 | B2 * | 2/2013 | Di Crescenzo | 726/9 |
| 8,464,324 | B2 * | 6/2013 | Mechaley, Jr. | 726/5 |
| 2003/0210127 | A1 * | 11/2003 | Anderson | 340/5.27 |
| 2004/0030934 | A1 * | 2/2004 | Mizoguchi et al. | 713/202 |
| 2004/0172564 | A1 * | 9/2004 | Federova et al. | 713/202 |
| 2004/0230843 | A1 * | 11/2004 | Jansen | 713/202 |
| 2004/0250138 | A1 * | 12/2004 | Schneider | 713/202 |
| 2005/0071686 | A1 * | 3/2005 | Bagga et al. | 713/202 |
| 2005/0144484 | A1 * | 6/2005 | Wakayama | 713/202 |

(Continued)

FOREIGN PATENT DOCUMENTS

| | | |
|---|---|---|
| JP | 10-097500 | 4/1998 |
| JP | 2001-282738 | 10/2001 |

(Continued)

OTHER PUBLICATIONS

Japanese Patent Application No. 2011-135066; Notification of Reasons for Refusal; Mailed Aug. 7, 2012 (English translation).

(Continued)

*Primary Examiner* — David Garcia Cervetti
(74) *Attorney, Agent, or Firm* — Blakely, Sokoloff, Taylor & Zafman LLP (57) ABSTRACT

According to one embodiment, an information processor includes a display module and an operation module. The display module displays a plurality of display objects each at a predetermined display position. The display objects are selected in advance by a user from a plurality of objects and includes authentication objects. The operation module is used for operation to select the authentication objects in a predetermined order upon user authentication.

11 Claims, 11 Drawing Sheets

(56) References Cited

U.S. PATENT DOCUMENTS

| | | | |
|---|---|---|---|
| 2006/0174339 A1* | 8/2006 | Tao | 726/18 |
| 2006/0206717 A1* | 9/2006 | Holt et al. | 713/182 |
| 2006/0206919 A1* | 9/2006 | Montgomery et al. | 726/2 |
| 2006/0248344 A1* | 11/2006 | Yang | 713/183 |
| 2007/0130618 A1* | 6/2007 | Chen | 726/8 |
| 2007/0226784 A1* | 9/2007 | Ueda et al. | 726/5 |
| 2007/0234063 A1* | 10/2007 | Ueda et al. | 713/183 |
| 2007/0266428 A1* | 11/2007 | Downes et al. | 726/5 |
| 2007/0277224 A1* | 11/2007 | Osborn et al. | 726/2 |
| 2008/0222417 A1* | 9/2008 | Downes et al. | 713/172 |
| 2008/0244700 A1* | 10/2008 | Osborn et al. | 726/2 |
| 2009/0172810 A1* | 7/2009 | Won et al. | 726/19 |
| 2009/0178136 A1* | 7/2009 | Ruddy | 726/19 |
| 2009/0300732 A1* | 12/2009 | Hwang et al. | 726/5 |
| 2010/0169958 A1* | 7/2010 | Werner et al. | 726/6 |
| 2010/0287382 A1* | 11/2010 | Gyorffy et al. | 713/185 |
| 2010/0322485 A1* | 12/2010 | Riddiford | 382/115 |
| 2011/0016520 A1* | 1/2011 | Cohen et al. | 726/19 |
| 2011/0053685 A1* | 3/2011 | Kim et al. | 463/29 |
| 2011/0096997 A1* | 4/2011 | Marciszko et al. | 382/218 |
| 2011/0154444 A1* | 6/2011 | Sriraghavan et al. | 726/4 |
| 2011/0202982 A1* | 8/2011 | Alexander et al. | 726/7 |
| 2011/0321125 A1* | 12/2011 | Kyohgoku et al. | 726/2 |
| 2012/0036573 A1* | 2/2012 | Yang | 726/16 |
| 2012/0159614 A1* | 6/2012 | Griffin et al. | 726/19 |
| 2012/0159615 A1* | 6/2012 | Griffin et al. | 726/19 |
| 2012/0159616 A1* | 6/2012 | Griffin et al. | 726/19 |
| 2012/0167199 A1* | 6/2012 | Riddiford | 726/16 |
| 2012/0272311 A1* | 10/2012 | Althammer et al. | 726/16 |
| 2012/0291120 A1* | 11/2012 | Griffin | 726/19 |
| 2013/0036461 A1* | 2/2013 | Lowry | 726/19 |

FOREIGN PATENT DOCUMENTS

| | | |
|---|---|---|
| JP | 2002-297546 | 10/2002 |
| JP | 2005-044121 | 2/2005 |
| JP | 2008-242589 | 10/2008 |
| WO | WO 2010-092922 | 8/2010 |

OTHER PUBLICATIONS

Satoshi Yoneda, [Security] Easy and Quick! "Single-point Security" Products to Prevent Information Leakage, COMPUTERWORLD Get Technology Right, vol. 2, No. 10, Japan, IDG Japan, Inc., Oct. 1, 2005, pp. 88-95.

* cited by examiner

INFORMATION PROCESSOR, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2011-135066, filed on Jun. 17, 2011, the entire contents of which are incorporated herein by reference.

FIELD

Embodiments described herein relate generally to an information processor, an information processing method, and a computer program product.

BACKGROUND

Generally, in application programs, computer systems, network systems, and the like, user authentication is performed to check whether the user who is about to use them is a valid user.

Although there have been proposed a variety of user authentication technologies, the combination of a user ID and a password corresponding thereto is the most common method of authentication. To further improve the security, there has been proposed a technology in which the location of objects, such as operation buttons, on the authentication screen is changed each time.

For the user to be authenticated, if the location of objects on the authentication screen is changed each time, he/she has to search for a desired button each time. This is troublesome and inconvenient for the user.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an information processor comprises a display module and an operation module. The display module is configured to display a plurality of display objects each at a predetermined display position. The display objects are selected in advance by a user from a plurality of objects and comprises authentication objects. The operation module is configured to be used for operation to select the authentication objects in a predetermined order upon user authentication.

Figure 1:
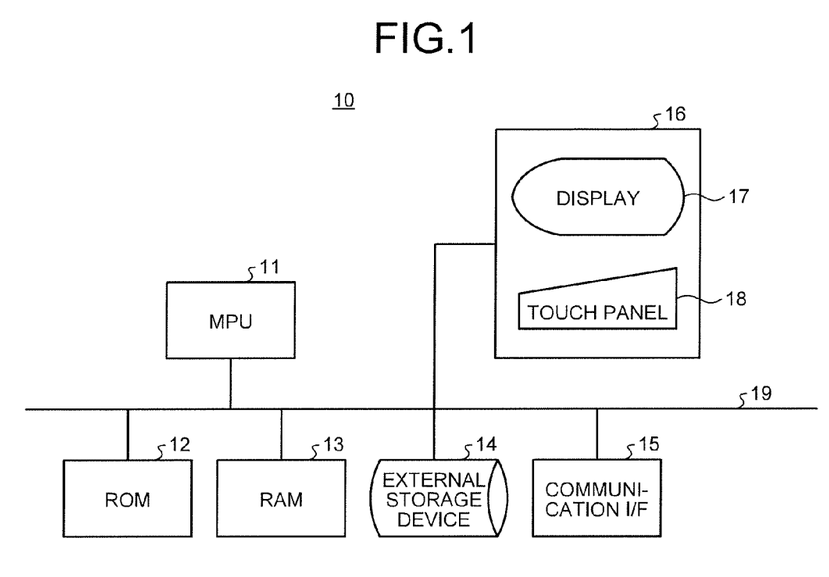
FIG. 1 is an exemplary schematic block diagram of a configuration of a personal computer (PC) as an information processor according to a first embodiment.

FIG. 1 is a schematic block diagram of a configuration of a personal computer (PC) 10 as an information processor according to a first embodiment. As illustrated in FIG. 1, the PC 10 comprises a microprocessor (MPU) 11, a read-only memory (ROM) 12, a random-access memory (RAM) 13, an external storage device 14, a communication interface (I/F) 15, and a touch panel display 16, which are connected by a bus 19. The MPU 11 controls the overall operation of the PC 10. The ROM 12 stores various types of data including a control program of the MPU 11 in a nonvolatile manner. The RAM 13 temporarily stores various types of data and provides a work area. The external storage device 14 may be, for example, a hard disk drive (HDD) or a solid-state drive (SSD) configured to store various types of data. The communication I/F 15 performs communication via a communication network such as a local area network (LAN) and the Internet. The touch panel display 16 displays various types of information and is user for various types of operations. The touch panel display 16 comprises a display 17 and a touch panel 18. The display 17 is a display module comprising, for example, a liquid crystal display (LCD) or an electroluminescent (EL) display. The touch panel 18 is an operation module comprising, for example, a resistive touch panel or a capacitance touch panel.

In the first embodiment, an example will be explained in which images of playing cards (images of a total of 52 cards including 13 ranks of each of four suits, clubs, diamonds, hearts, and spades) are displayed on the display screen of the touch panel display 16 as display object. More specifically, if a user selects cards selected in advance by himself/herself from the cards displayed on a user authentication screen (login screen) in the order specified in advance by himself/herself, the user authentication is determined to be successful.

Figure 2:
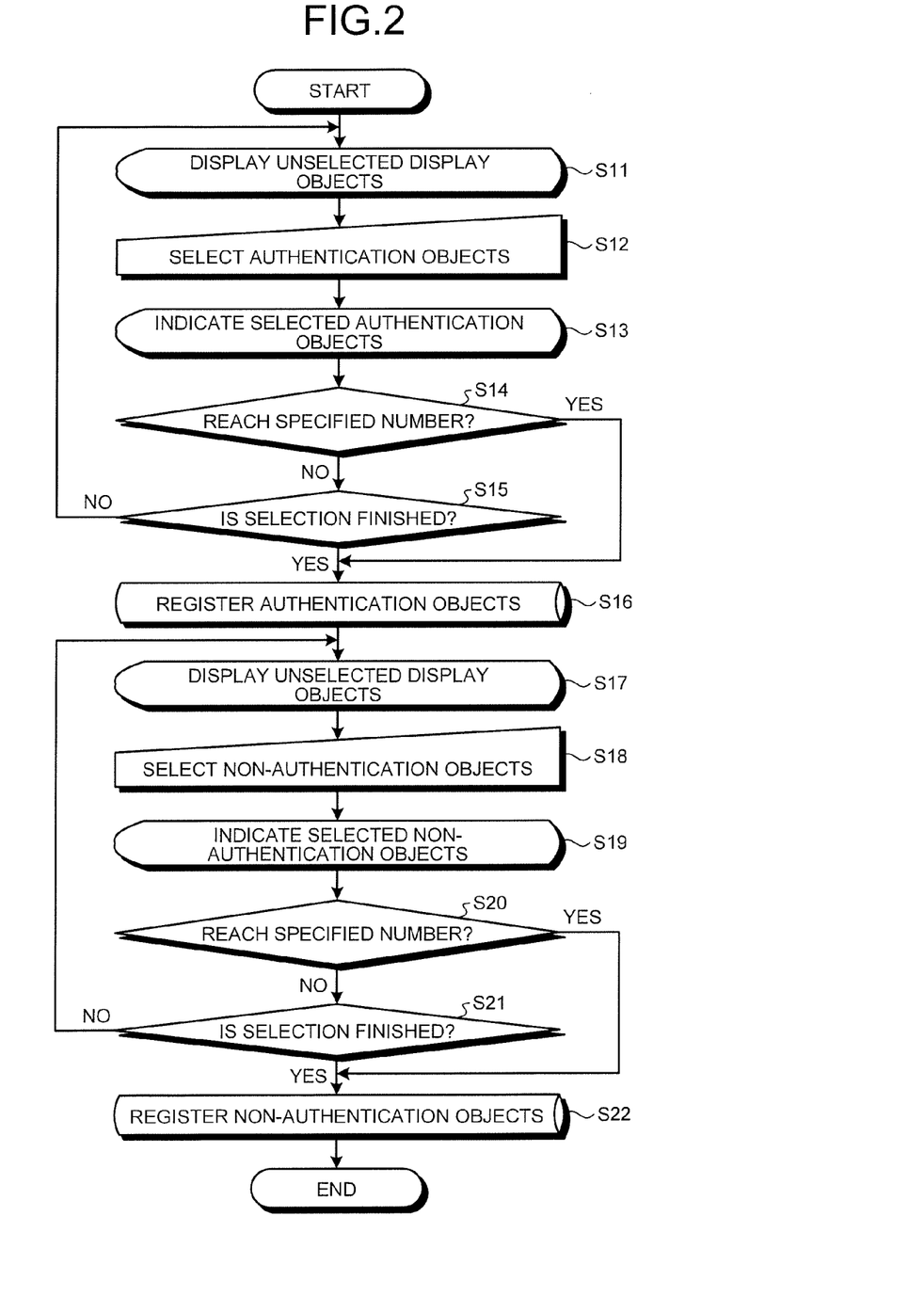
FIG. 2 is an exemplary flowchart of a process at the time of initial setup in the first embodiment.

FIG. 2 is a flowchart of the operation of the PC 10 at the time of initial setup. In the first embodiment, it is required to register in advance a plurality of cards to be used as objects for user authentication (authentication objects) and the order to select them with respect to each user. The initial setup for this will be described.

When the user starts up the PC 10 and an initial-setup application is activated, all or part of selectable cards (unselected display objects) are displayed on the display screen of the display 17. In the case where part of selectable cards are displayed, there may be provided a button to display other cards that are not displayed. In the following, for the sake of simplicity, the case will be described where all selectable cards are displayed on the display screen of the display 17.

Figure 3:
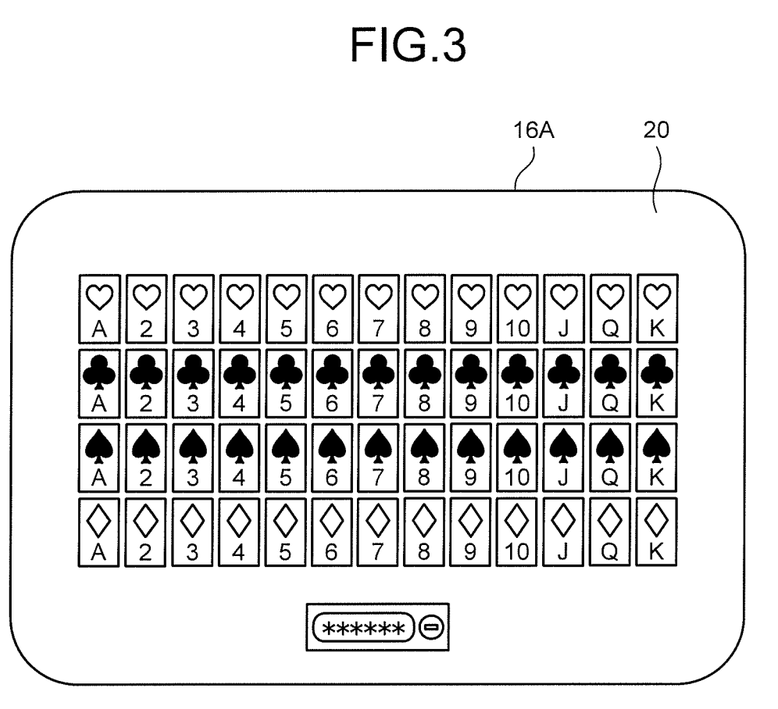
FIG. 3 is an exemplary schematic diagram for explaining a selection screen for display objects including authentication objects in the first embodiment.

FIG. 3 illustrates an example of a selection screen for display objects including authentication objects. As illustrated in FIG. 3, on an object selection screen 20 displayed on a display screen 16A of the touch panel display 16, a total of 52 cards (unselected display objects in the initial state) are displayed. In this state, the user selects a predetermined number of cards (in the following description, eight cards) used in the user authentication screen.

The cards (display objects) used in the user authentication screen includes a first specified number of cards (in the first embodiment, five cards) as authentication objects and a second specified number of cards (in the first embodiment, three cards) as non-authentication objects that are displayed so that others cannot easily find out the authentication objects. The authentication objects and the non-authentication objects are collectively referred to as display objects.

In the first embodiment, display objects are selected in such a manner that, for example, authentication objects are selected first and then non-authentication objects are selected.

First, the MPU 11 displays all cards that can be selected as authentication objects (unselected display objects) on the display screen of the display 17 that constitutes the touch panel display 16 to prompt the user to select authentication objects (S11).

With this, the user selects any of the cards through the touch panel 18 that constitutes the touch panel display 16 (S12). The MPU 11 indicates that the cards are selected as authentication objects (S13). More specifically, for example, the images of the cards selected as authentication objects are each displayed as being surrounded with a frame or highlighted with a number nearby corresponding to the order in which they are selected. Alternatively, a new window is opened to display the images of the selected cards in the order in which they are selected to clearly indicate the selected objects.

The MPU 11 then determines whether the number of the authentication objects currently selected reaches the first specified number (S14). If the number of the authentication objects currently selected reaches the first specified number (Yes at S14), the MPU 11 associates the authentication objects currently selected with the user as well as registering and storing them in the external storage device 14 together with information on the selection order in which they are selected (S16).

If the number of the authentication objects currently selected is yet to reach the first specified number (No at S14), the MPU 11 determines whether the user finishes to select authentication objects (S15).

If the user has not yet finished to select authentication objects (No at S15), the process returns to S11 to repeat the same process. In this case, for example, if two authentication objects have already been selected, at S11, remaining 50 cards (52−2 cards) are displayed as all cards that can be selected as authentication objects (unselected display objects).

On the other hand, if the user has finished to select authentication objects (Yes at S15), the MPU 11 stores and registers information specifying all the authentication objects selected by the user and the information on their selection order in the external storage device 14 in association with the user ID (S16).

Next, the MPU 11 displays all cards that can be selected as non-authentication objects (unselected display objects) on the display screen of the display 17 that constitutes the touch panel display 16 to prompt the user to select non-authentication objects (S17). For example, if five cards have already been selected as authentication objects, the MPU 11 displays the remaining 47 cards.

With this, the user selects any of the cards through the touch panel 18 that constitutes the touch panel display 16 (S18). The MPU 11 indicates that the cards are selected as non-authentication objects (S19). More specifically, for example, the images of the cards selected as non-authentication objects are each displayed as being surrounded with a frame of a different color from that of authentication objects or displayed blinking. Alternatively, a new window is opened to display the images of the selected cards together with the selected authentication objects to clearly indicate the selected objects.

The MPU 11 then determines whether the number of the non-authentication objects currently selected reaches the second specified number (S20). If the number of the non-authentication objects currently selected reaches the second specified number (Yes at S20), the MPU 11 registers and stores the non-authentication objects currently selected in the external storage device 14 in association with the user and the authentication objects corresponding to the user (S22).

If the number of the non-authentication objects currently selected is yet to reach the second specified number (No at S20), the MPU 11 determines whether the user finishes to select non-authentication objects (S21).

If the user has not yet finished to select non-authentication objects (No at S21), the process returns to S17 to repeat the same process. In this case, for example, if two non-authentication objects have already been selected, at S17, remaining 45 cards (52−5−2 cards) are displayed as all cards that can be selected as non-authentication objects (unselected display objects).

On the other hand, if the user has finished to select non-authentication objects (Yes at S21), the MPU 11 stores and registers information specifying all the non-authentication objects selected by the user in the external storage device 14 in association with the user ID (S22).

Figure 4:
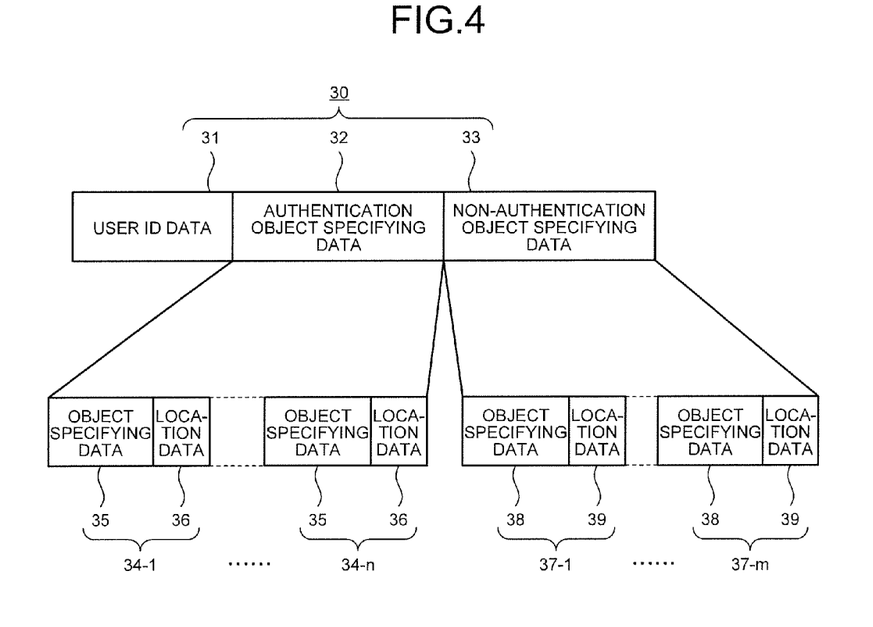
FIG. 4 is an exemplary schematic diagram for explaining a data format of authentication data to be stored in an external storage device in the first embodiment.

FIG. 4 illustrates a data format of authentication data 30 to be stored in the external storage device 14. The authentication data 30 basically includes user ID data 31, authentication object specifying data 32, and non-authentication object specifying data 33. The user ID data 31 identifies a user. The authentication object specifying data 32 specifies authentication objects corresponding to the user. The non-authentication object specifying data 33 specifies non-authentication objects corresponding to the user.

The authentication object specifying data 32 includes n pieces of authentication object data 34-1 to 34-$n$ (in the first embodiment, n is a natural number not larger than 5, i.e., the maximum number of n=5). Each authentication object data 34-$x$ (x: a natural number equal to or less than n) includes object specifying data 35 and location data 36. The object specifying data 35 specifies an authentication object. The location data 36 specifies the location (display position) of the authentication object specified by the object specifying data 35 on the user authentication screen (login screen).

The non-authentication object specifying data 33 includes m pieces of non-authentication object data 37-1 to 37-$m$ (in the first embodiment, m is a natural number not larger than 3, i.e., the maximum number of m=3). Each non-authentication object data 37-$y$ (y: a natural number equal to or less than m) includes object specifying data 38 and location data 39. The object specifying data 38 specifies a non-authentication object. The location data 39 specifies the location (display position) of the non-authentication object specified by the object specifying data 38 on the user authentication screen (login screen).

Figure 5:
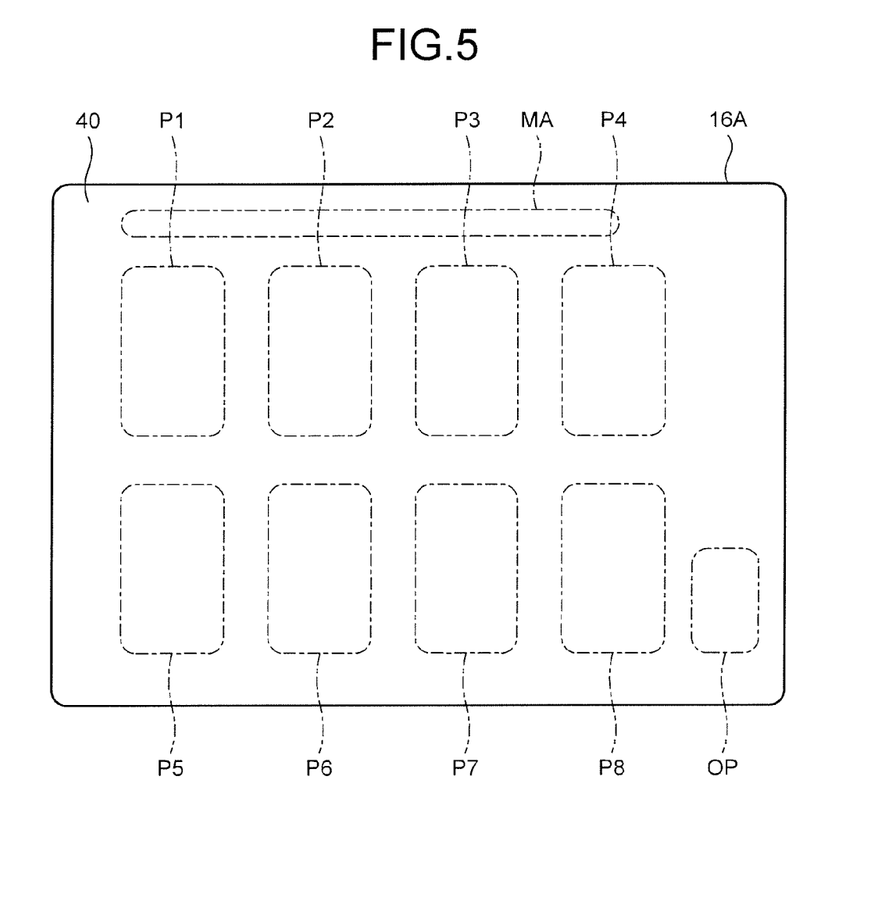
FIG. 5 is an exemplary schematic diagram for explaining a configuration of a user authentication screen (login screen) in the first embodiment.

The user authentication screen will be described. FIG. 5 illustrates an example of a configuration of a user authentication screen (login screen) 40. The user authentication screen 40 comprises a message display area MA, display areas P1 to P8, and an operation area OP. In the message display area MA, a message that prompts the user for input or the like is displayed at the time of login. In each of the display areas P1 to P8, a display object (an authentication object or a non-authentication object) is displayed. Thus, up to eight display objects (authentication objects and non-authentication objects) can be displayed in the display areas P1 to P8. In the operation area OP, operation buttons for various types of operation are arranged. The location data 36 and 39 includes data specifying one of the display areas P1 to P8.

Figure 6:
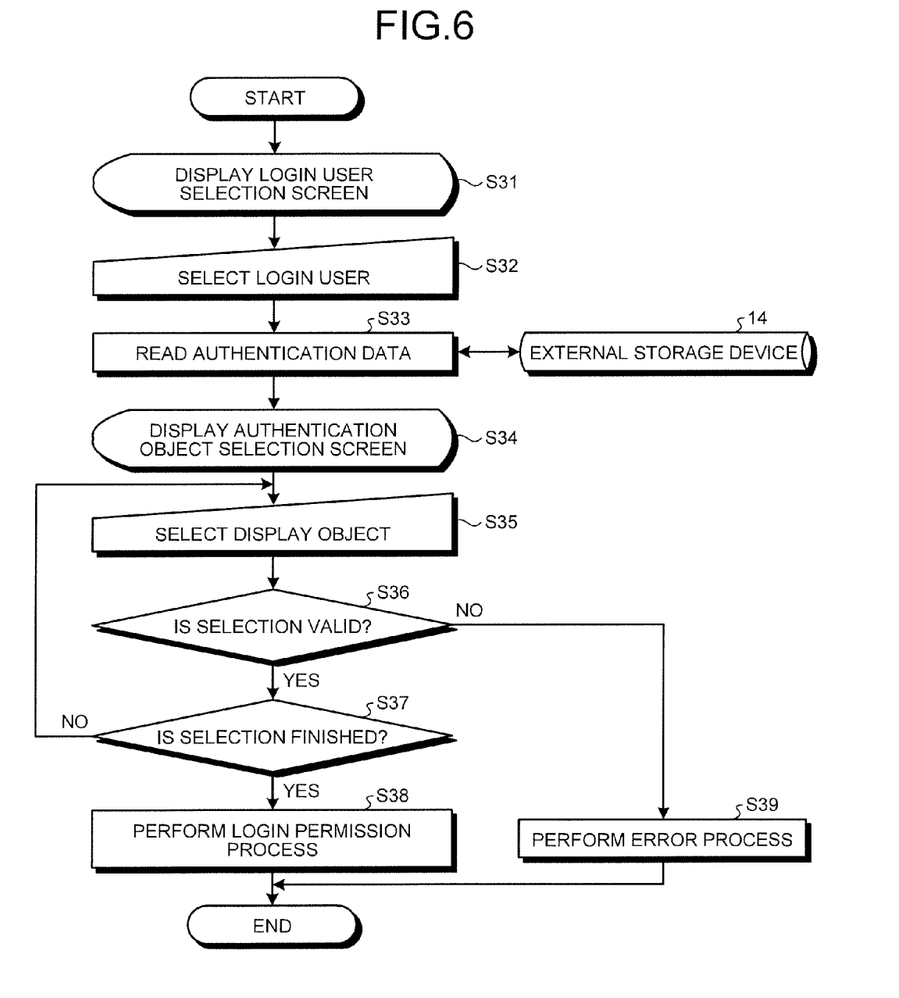
FIG. 6 is an exemplary flowchart of a login process in the first embodiment.
Figure 7:
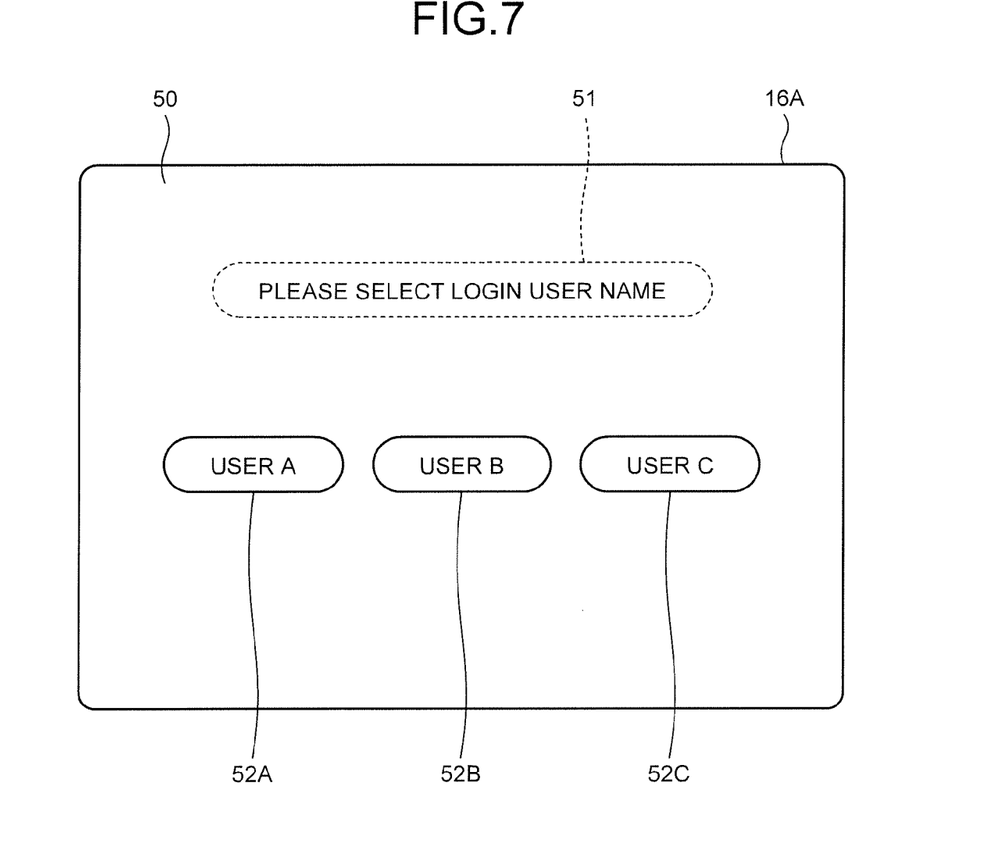
FIG. 7 is an exemplary schematic diagram for explaining a login user selection screen in the first embodiment.

FIG. 6 is a flowchart of a login process. FIG. 7 illustrates an example of a login user selection screen 50. The MPU 11 displays the login user selection screen 50 in the login process (S31).

The login user selection screen 50 is displayed on the display screen 16A of the touch panel display 16. The login user selection screen 50 comprises a message area 51, a first login user selection button 52A, a second login user selection button 52B, and a third login user selection button 52C. Displayed in the message area 51 is a message that prompts the user to select a login user. The first login user selection button 52A is used to specify a user A as a login user. The second login user selection button 52B is used to specify a user B as a login user. The third login user selection button 52C is used to specify a user C as a login user. While FIG. 7 illustrates, by way of example, the case of three login users, the number of login users can be arbitrarily set within the acceptable range of the login program.

By touching any one of the first to third login user selection buttons 52A to 52C, the user selects and specifies a login user through the touch panel 18 (S32). The MPU 11 specifies a login user selection button 52Z (Z: A to C) touched by the user, and reads the authentication data 30 (see FIG. 4) referring to the external storage device 14 based on corresponding user ID (S33). The MPU 11 then displays an authentication object selection screen based on the authentication data 30 (S34).

Figure 8:
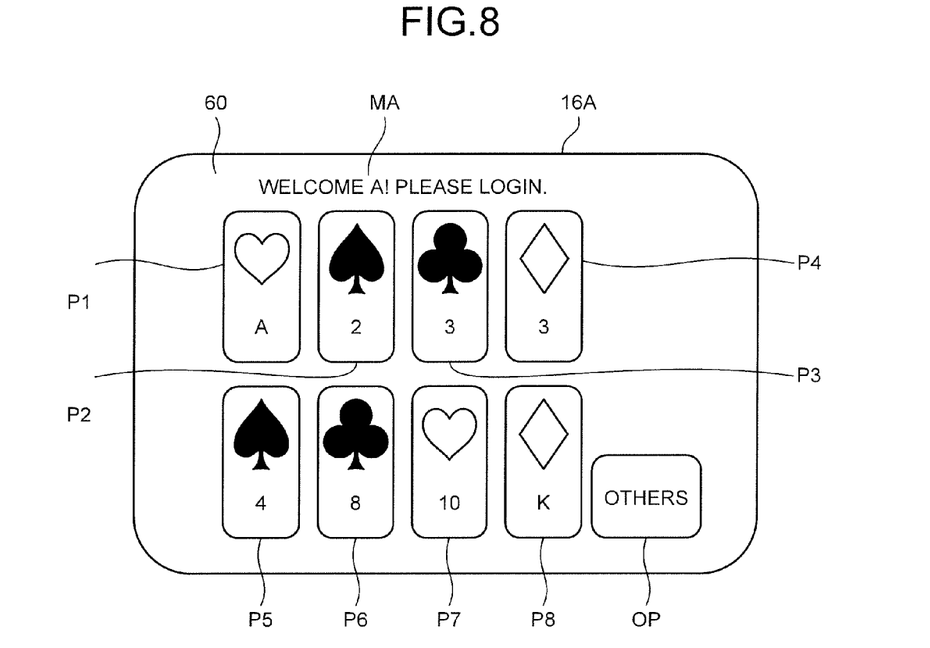
FIG. 8 is an exemplary schematic diagram for explaining an authentication object selection screen in the first embodiment.

FIG. 8 illustrates an example of an authentication object selection screen 60. On the authentication object selection screen 60, a message "Welcome A! Please login" is displayed in the message display area MA to prompt the user to login. Besides, based on the authentication object specifying data 32 and the non-authentication object specifying data 33 contained in the authentication data 30, "Ace of hearts" card is displayed as a display object in the display area P1. Similarly, "2 of spades" card, "3 of clubs" card, and "3 of diamonds" card are displayed as display objects in the display areas P2, P3, and P4, respectively.

Further, "4 of spades" card, "8 of clubs" card, "10 of hearts" card, and "King of diamonds" card are displayed as display objects in the display areas P5, P6, P7, and P8, respectively. Displayed in the operation area OP is a selection button "others" to allow the user to select another authentication method (e.g., common password authentication, etc.).

In the following, it is assumed that, among the display objects, five cards "2 of spades", "3 of diamonds", "4 of spades", "10 of hearts", and "King of diamonds" are set as authentication objects, while three cards "Ace of hearts", "3 of clubs", and "8 of clubs" are set as non-authentication objects.

In the valid selection order of the authentication objects for the valid user, "3 of diamonds", "4 of spades", "2 of spades", "King of diamonds", and "10 of hearts" are set in this order. This order may be the ascending order of the value of x of the authentication object data 34-x (x: a natural number equal to or less than n). That is, in the above case, the authentication object data are stored in such a manner that the data 34-1 corresponds to "3 of diamonds", the data 34-2 corresponds to "4 of spades", the data 34-3 corresponds to "2 of spades", the data 34-4 corresponds to "King of diamonds", and the data 34-5 corresponds to "10 of hearts". If the user selects any of the display objects by touching the touch panel 18 (S35), the MPU 11 determines whether the selection is valid (S36).

More specifically, if the user touches the "3 of diamonds" card first, the selection is determined to be valid. If the user touches another card than "3 of diamonds", the selection is determined to be invalid. Having determined that the selection is invalid (No at S36), the MPU 11 performs error process such as to notify the user that user authentication fails and login is not allowed, or, if user authentication fails successively a plurality of times, to notify the user that login is not allowed on that day (S39).

On the other hand, having determined that the selection is valid (Yes at S36), the MPU 11 determines whether the user finishes to select all the display objects (S37). If all the display objects have not yet been selected (No at S37), the process returns to S35 to repeat the above process for the next selection.

Having determined that all the display objects have been selected, i.e., the cards are touched in the order of "3 of diamonds", "4 of spades", "2 of spades", "King of diamonds", and "10 of hearts" (Yes at S37), the MPU 11 performs login permission process to notify the user that login is allowed and to create an operation environment corresponding to the user (S38).

As described above, according to the first embodiment, each user can arbitrarily select playing cards (authentication objects and non-authentication objects) used for user authentication. Thus, user authentication process can be reliably retained. Besides, the location of playing cards (authentication objects and non-authentication objects) used for user authentication is unchanged on the user authentication screen 40, which further facilitates to retain the authentication process. This improves the convenience for the user.

In the first embodiment, 52 playing cards are used as authentication objects. According to a second embodiment, for example, four suits (clubs, diamonds, hearts, and spades) and 13 ranks (Ace, 2 to 10, Jack, Queen, and King) are considered as different objects, and only the 13 ranks are actually used as authentication objects in user authentication process.

In this case, the suits of the cards have no meaning as authentication objects. Thus, by setting the suits at random, a different looking user authentication screen can be displayed each time. This can improve the security.

Figure 9:
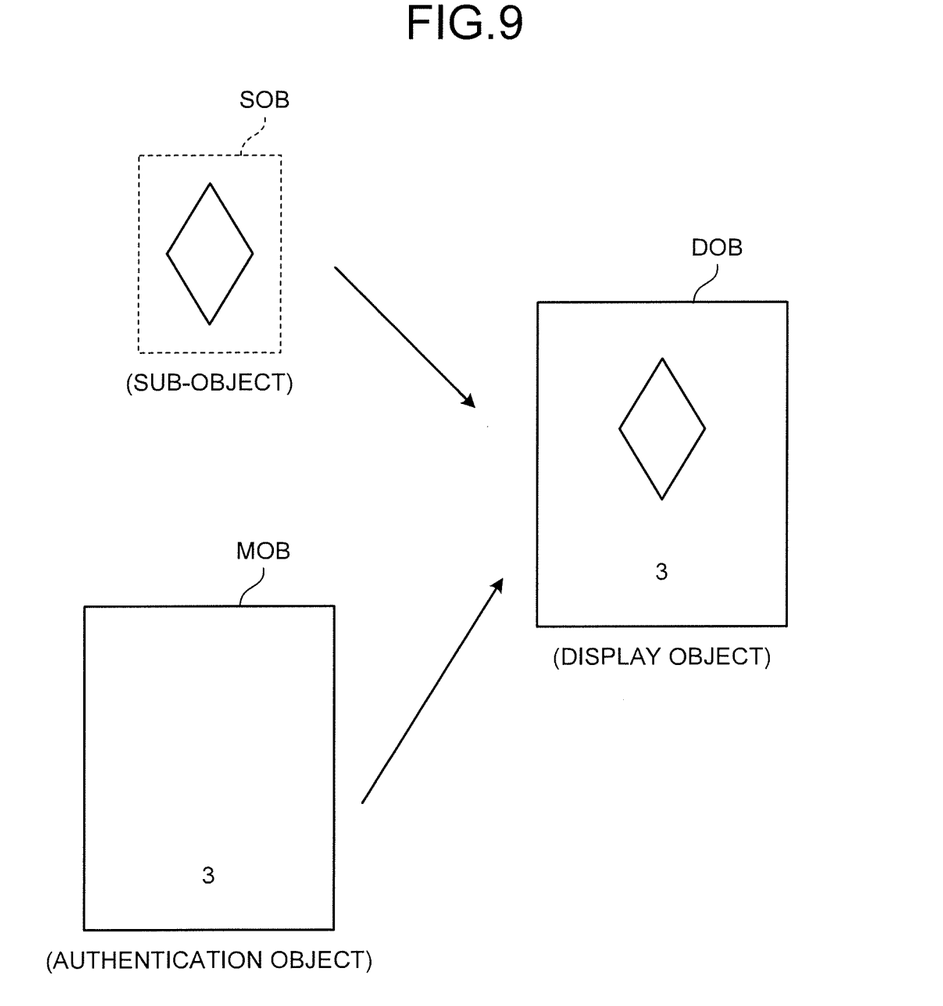
FIG. 9 is an exemplary schematic diagram for explaining how to generate a display object according to a second embodiment.

FIG. 9 is a schematic diagram for explaining how to generate a display object according to the second embodiment. In the second embodiment, portions corresponding to 13 ranks (Ace, 2 to 10, Jack, Queen, and King) of cards are used as main objects MOB, while portions corresponding to four suits are used as sub-objects SOB for only display. On the display screen 16A of the touch panel display 16, the image of a sub-object SOB is superimposed on the image of a main object MOB to integrally display the main object MOB and the sub-object SOB. Thus, the main object MOB and the sub-object SOB are visually used as an object DOB (authentication object or non-authentication object) corresponding to the display object of the first embodiment. Namely, in the second embodiment, the object that actually corresponds to the display object of the first embodiment is the main object MOB. In the case of cards, the image of a sub-object (e.g., heart) arbitrarily selected from a plurality of sub-objects (images of four suits of club, diamond, heart, and spade) is superimposed on the image of a main object MOB (an image of a rank of cards, e.g., "7"), and the main object and the sub-object are visually displayed as one object (in this case, "7 of hearts" card).

More specifically, if the ranks "Ace", "King", "7", "3", and "Queen" correspond to authentication objects, while the ranks "Jack", "4", and "9" correspond to non-authentication objects, "Ace of hearts", "King of clubs", "7 of diamonds", "3 of hearts", and "Queen of spades" are displayed as authentication objects and "Jack of diamonds", "4 of clubs", and "9 of spades" are displayed as non-authentication objects on the authentication screen for a certain user on one occasion. On another occasion, "Ace of clubs", "King of clubs", "7 of hearts", "3 of spades", and "Queen of diamonds" are displayed as authentication objects and "Jack of hearts", "4 of diamonds", and "9 of clubs" are displayed as non-authentication objects on the authentication screen for the same user.

As a result, differently from conventional authentication using a combination of numbers as an authentication key, the user authentication screen is not the same every time and can be displayed differently. This can further ensure the security.

As described above, according to the second embodiment, the security in effect can be improved without reducing the operability of the user authentication screen for the user.

In the above embodiments, the information processor is described by way of example as a stand-alone PC. The information processor may be a PC connected to a server using a browser in a cloud computing system.

Figure 10:
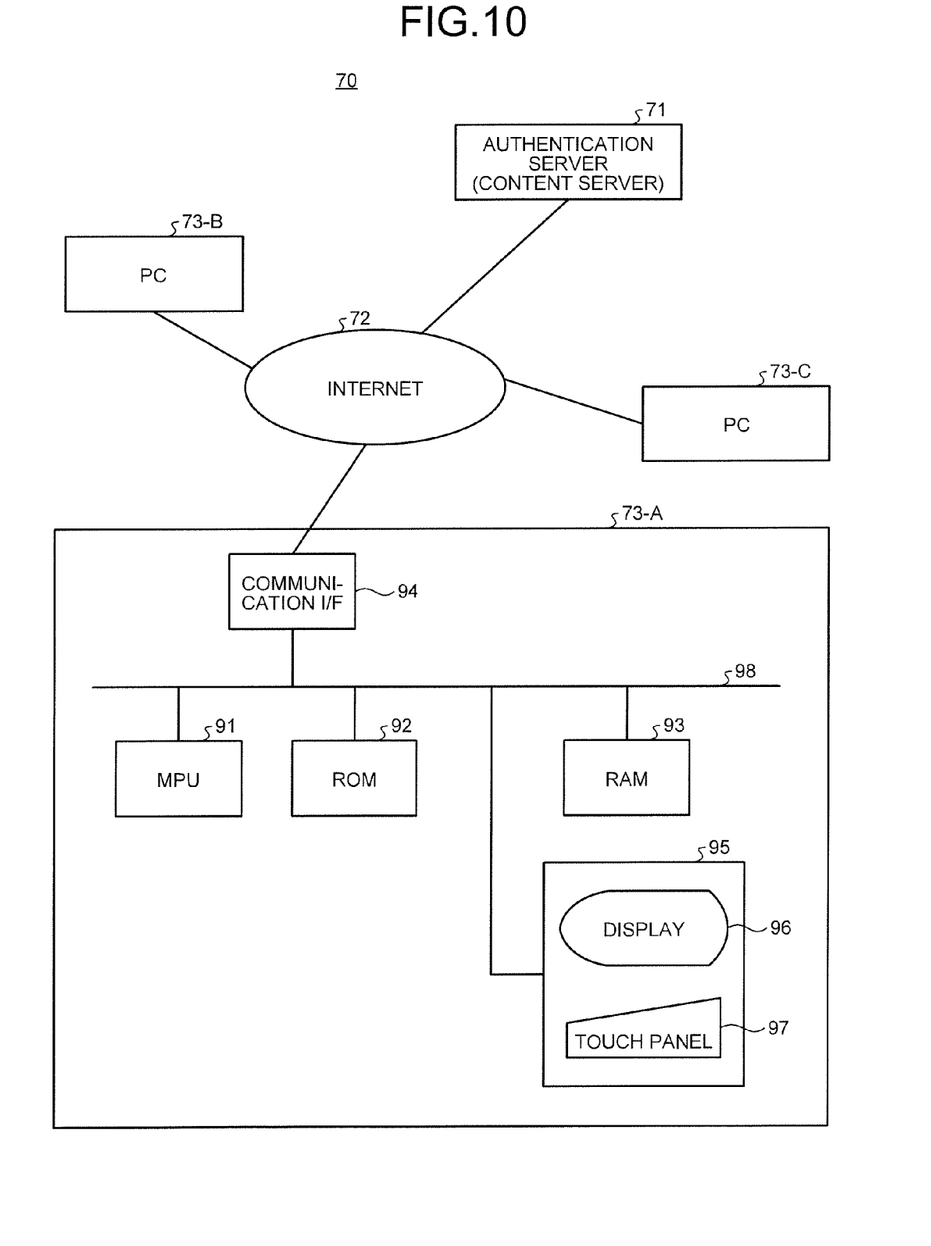
FIG. 10 is an exemplary schematic diagram of a configuration of a cloud computing system according to a third embodiment.

FIG. 10 is a schematic diagram of a configuration of a cloud computing system 70 according to a third embodiment. The cloud computing system 70 comprises one or more authentication servers 71, the Internet 72, and PCs 73-A to 73-C. The authentication server 71 performs user authentication and provides various types of content. The Internet 72 functions as a communication network. The PCs 73-A to 73-C are connected to the authentication server 71 via the Internet 72 as terminal devices.

In effect, the PCs 73-A to 73-C provide the same function as the touch panel display 16 described in the first embodiment, the authentication server 71 provides the same function as the MPU 11, the ROM 12, and the RAM 13, and the Internet 72 as a communication network provides the same function as the bus 19.

Figure 11:
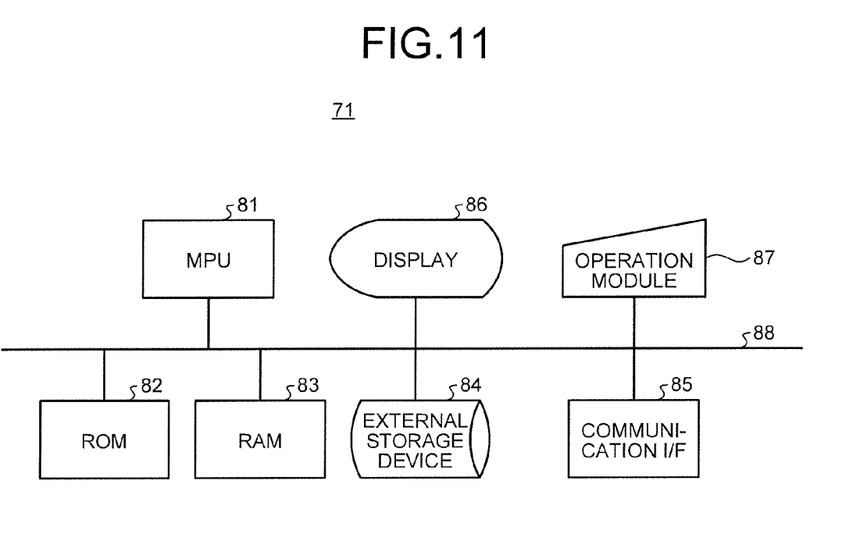
FIG. 11 is an exemplary block diagram of a configuration of an authentication server in the third embodiment.

FIG. 11 is a block diagram of a configuration of the authentication server 71. The authentication server 71 comprises a MPU 81, a ROM 82, a RAM 83, an external storage device 84, a communication I/F 85, a display 86, and an operation module 87, which are connected by a bus 88. The MPU 11 controls the overall operation of the authentication server 71. The ROM 82 stores various types of data including a control program of the MPU 81 in a nonvolatile manner. The RAM 83 temporarily stores various types of data and provides a work area. The external storage device 84 may be, for example, a hard disk drive (HDD) or a solid-state drive (SSD) configured to store various types of data including authentication data for each user. The communication I/F 85 performs communication via a communication network such as a LAN and the Internet. The display 86 displays various types of information. The operation module 87 comprises a keyboard, a mouse, a touch panel, a tablet, and the like for various types of operations.

Referring back to FIG. 10, configuration of the PCs 73-A to 73-C will be described. The PCs 73-A to 73-C are of like configuration and thus but one of them, for example, the PC 73-A will be described. As illustrated in FIG. 10, the PC 73-A comprises a MPU 91, a ROM 92, a RAM 93, a communication I/F 94, and a touch panel display 95, which are connected by a bus 98. The MPU 91 controls the overall operation of the PC 73-A. The ROM 92 stores various types of data including a control program of the MPU 91, a program to download various application programs from the authentication server 71 functioning as a content server, and programs such as a browser in a nonvolatile manner. The RAM 93 temporarily stores various types of data and provides a work area. The communication I/F 94 performs communication via a communication network such as a LAN and the Internet. The touch panel display 95 displays various types of information and is used for various types of operations.

The touch panel display 95 comprises a display 96 and a touch panel 97. The display 96 is a display module comprising, for example, an LCD or an EL display. The touch panel 97 is an operation module comprising, for example, a resistive touch panel or a capacitance touch panel.

Referring again to FIG. 2, a description will be given of the operation of the PC 73-A at the time of initial setup in the cloud computing system 70. When the user starts up the PC 73-A, the MPU 91 accesses the authentication server 71 via the communication I/F 94 and the Internet 72 using temporary user ID and password. Having been accessed, the MPU 81 of the authentication server 71 activates an initial-setup application, and displays all selectable cards (unselected display objects) on the display screen of the display 96 of the PC 73-A. As in the first embodiment, part of the selectable cards may be displayed.

In this state, as will be described below, the user selects a predetermined number of cards (in the following description, eight cards) used in the user authentication screen.

First, the MPU 81 of the authentication server 71 displays all cards that can be selected as authentication objects (unselected display objects) on the display screen of the display 96 that constitutes the touch panel display 95 of the PC 73-A to prompt the user to select authentication objects (S11).

With this, the user selects any of the cards through the touch panel 97 that constitutes the touch panel display 95 (S12). The MPU 81 of the authentication server 71 indicates that the cards are selected as authentication objects on the display 96 (S13).

The MPU 81 of the authentication server 71 then determines whether the number of the authentication objects currently selected reaches the first specified number (S14). If the number of the authentication objects currently selected reaches the first specified number (Yes at S14), the MPU 81 associates the authentication objects currently selected with the user as well as registering and storing them in the external storage device 84 together with information on the selection order in which they are selected (S16).

If the number of the authentication objects currently selected is yet to reach the first specified number (No at S14), the MPU 81 of the authentication server 71 determines whether the user finishes to select authentication objects (S15).

If the user has not yet finished to select authentication objects (No at S15), the process returns to S11 to repeat the same process. In this case, for example, if two authentication objects have already been selected, at S11, remaining 50 cards (52−2 cards) are displayed as all cards that can be selected as authentication objects (unselected display objects).

On the other hand, if the user has finished to select authentication objects (Yes at S15), the MPU 81 stores and registers information specifying all the authentication objects selected by the user and the information on their selection order in the external storage device 84 in association with the user ID (S16).

Next, the MPU 81 of the authentication server 71 displays all cards that can be selected as non-authentication objects (unselected display objects) on the display screen of the display 96 that constitutes the touch panel display 95 to prompt the user to select non-authentication objects (S17).

With this, the user selects any of the cards through the touch panel 97 that constitutes the touch panel display 95 (S18). The MPU 81 of the authentication server 71 indicates that the cards are selected as non-authentication objects on the display 96 (S19).

The MPU 81 of the authentication server 71 then determines whether the number of the non-authentication objects currently selected reaches the second specified number (S20). If the number of the non-authentication objects currently selected reaches the second specified number (Yes at S20), the MPU 81 registers and stores the non-authentication objects currently selected in the external storage device 84 in association with the user and the authentication objects corresponding to the user (S22).

If the number of the non-authentication objects currently selected is yet to reach the second specified number (No at S20), the MPU 81 of the authentication server 71 determines whether the user provides input to finish selecting non-authentication objects via the touch panel 97 that constitutes the touch panel display 95 (S21).

If the user has not yet finished to select non-authentication objects (No at S21), the process returns to S17 to repeat the same process.

On the other hand, if the user has finished to select non-authentication objects (Yes at S21), the MPU 81 of the authentication server 71 stores and registers information specifying all the non-authentication objects selected by the user in the external storage device 84 in association with the user ID (S22).

In the following, referring again to FIGS. 6 to 8, a description will be given of the operation of the cloud computing system 70 after the initial setup.

In response to a login request from the PC 73-A, the MPU 81 of the authentication server 71 displays the login user selection screen on the display 96 (S31).

By touching any one of the first to third login user selection buttons 52A to 52C on the touch panel display 95, the user selects and specifies a login user through the touch panel 97 (S32). The MPU 81 of the authentication server 71 specifies the login user selection button 52Z (Z: A to C) touched by the user, and reads the authentication data 30 (see FIG. 4) referring to the external storage device 84 based on corresponding user ID (S33). The MPU 81 then displays an authentication object selection screen on the display 96 based on the authentication data 30 (S34).

The display 96 of the PC 73-A displays the authentication object selection screen 60 as illustrated in FIG. 8, on which a message "Welcome A! Please login" is displayed in the message display area MA to prompt the user to login. Further, eight cards used for authentication are displayed. If the user selects any of the display objects by touching the touch panel 97 (S35), the MPU 81 of the authentication server 71 determines whether the selection is valid based on the authentication object specifying data 32 contained in the authentication data 30 (S36).

Having determined that the selection is invalid (No at S36), the MPU 81 of the authentication server 71 performs error process such as to notify the user that user authentication fails and login is not allowed, or, if user authentication fails successively a plurality of times, to notify the user that login is not allowed on that day (S39).

On the other hand, having determined that the selection is valid (Yes at S36), the MPU 81 determines whether the user finishes to select all the display objects (S37). If all the display objects have not yet been selected on the PC 73-A (No at S37), the process returns to S35 to repeat the above process for the next selection.

Having determined that all the display objects have been selected (Yes at S37), the MPU 81 of the authentication server 71 performs login permission process to notify the user that login is allowed and to create an operation environment corresponding to the user (S38). After that, the authentication server 71 provides its content to the PC 73-A regarding the user as a valid user.

As described above, according to the third embodiment, even on a PC that does not operate standalone such as those in a cloud computing system, each user can arbitrarily select playing cards (authentication objects and non-authentication objects) used for user authentication. Thus, user authentication process can be reliably retained. Besides, the location of playing cards (authentication objects and non-authentication objects) used for user authentication is unchanged on the user authentication screen 40, which further facilitates to retain the authentication process. This improves the convenience for the user.

According to the embodiments described above, substantially the same user authentication screen is displayed for each user each time they log in. This makes authentication easier. Thus, it is possible to improve the convenience for the user as well as to improve the security.

Although display objects are described herein by way of example as images of playing cards, they may be, for example, images of mahjong tiles, images of other playing cards, or the like.

While the information processor is described herein by way of example as a PC, it may be, for example, a portable information processor provided with a touch panel display such as a smartphone, a bank's automated teller machine (ATM), or the like.

Further, while the above embodiments are described herein by way of example as being applied to user authentication, they may be applied to any other types of authentication.

The control program executed on the information processor of the embodiments may be stored in a computer connected via a network such as the Internet so that it can be downloaded therefrom via the network. The control program may also be provided or distributed via a network such as the Internet. The control program may also be provided as being stored in advance in a ROM or the like.

Further, the control program may be provided as being stored in a computer-readable storage medium, such as a compact disc-read only memory (CD-ROM), a flexible disk (FD), a compact disc recordable (CD-R), and a digital versatile disc (DVD), as a file in an installable or executable format.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processor comprising:
    a storage module configured to store therein object specifying data comprising a plurality of display objects preliminarily selected from a plurality of types of objects by a user and location data configured to specify display positions corresponding to the object specifying data in accordance with a selection order upon user authentication, the display objects comprising at least one authentication object and at least one non-authentication object;
    a display module configured to display the display objects at predetermined display positions unchanged with respect to each user based on the object specifying data and the location data by referring to stored content of the storage module;
    an operation module configured to make a user perform a selection operation to select the authentication object upon user authentication; and
    a login permission module configured to perform login permission process if it is determined that the authentication object is selected in accordance with the selection order at the operation module, based on stored content of the storage module.

2. The information processor of claim 1, wherein the selection order of the authentication object for the user authentication is set in advance by the user.

3. The information processor of claim 1, further comprising:
    an input module configured to input user identification information configured to identify the user; and
    a display controller configured to display the display objects associated with the user on the display module.

4. The information processor of claim 3, wherein, upon displaying at least one of the display objects on the display module, the display controller is configured to display a display sub-object so as to be visually integrated with the at least one of the display objects.

5. The information processor of claim 4, wherein, with respect to at least one of the selected display objects, the display module is configured to superimpose display of a sub-object arbitrarily selected from a plurality of preset sub-objects on display of the display object so as to display the superimposed display as one visually integrated object.

6. The information processor of claim 3, wherein the storage module is configured to store therein the user identification information and the display objects selected by the user in association with each other.

7. The information processor of claim 1, wherein the operation module is further configured to make the user perform the preliminarily selection to select the display objects from the plurality of types of objects, and the storage module is configured to store therein the object specifying data comprising the display objects preliminarily selected by the operation module and the location data.

8. An information processing method applied to an information processor comprising a display device and an operation device, the information processing method comprising:
    storing object specifying data comprising a plurality of display objects preliminarily selected form a plurality of types of objects by a user and a location data configured to specify display positions corresponding to the object specifying data in accordance with a selection order upon user authentication, the display objects comprising at least one authentication object and at least one non-authentication object;
    displaying the display objects at predetermined display positions unchanged with respect to each user based on the object specifying data and the location data by referring to stored content stored at the storing;
    making a user perform a selection operation to select the authentication object upon user authentication; and
    performing login permission process if it is determined that the authentication object is selected in accordance with the selection order at the making, based on stored content stored at the storing.

9. The information processing method of claim 8, further comprising:
    making the user perform the preliminarily selection to select the display objects from the plurality of types of objects, wherein
    the storing stores the object specifying data comprising the preliminarily selected display objects and the location data.

10. A computer program product embodied on a non-transitory computer-readable storage medium and comprising code that, when executed, causes a computer comprising a display device and an operation device to perform:
    storing object specifying data comprising a plurality of display objects preliminarily selected form a plurality of types of objects by a user and a location data configured to specify display positions corresponding to the object specifying data in accordance with a selection order upon user authentication, the display objects comprising at least one authentication object and at least one non-authentication object;
    display the display objects at predetermined display positions unchanged with respect to each user based on the object specifying data and the location data by referring to stored content stored at the storing;
    making a user perform a selection operation to select the authentication object upon user authentication; and
    performing login permission process if it is determined that the authentication object is selected in accordance with the selection order at the making, based on stored content stored at the storing.

11. The computer program product of claim 10, further comprising code that, when executed, causes the computer to perform:
    making the user perform the preliminarily selection to select the display objects from the plurality of types of objects, wherein
    the storing stores the object specifying data comprising the preliminarily selected display objects and the location data.

* * * * *